United States Patent [19]

Allfather

[11] Patent Number: 4,541,040
[45] Date of Patent: Sep. 10, 1985

[54] POWER CONVERTING

[75] Inventor: Lars P. Allfather, Guilderland, N.Y.

[73] Assignee: Doble Engineering Company, Watertown, Mass.

[21] Appl. No.: 553,768

[22] Filed: Nov. 21, 1983

[51] Int. Cl.³ .............................................. H02M 3/335
[52] U.S. Cl. .......................................... 363/37; 363/98
[58] Field of Search ............................. 363/37, 17-26, 363/95-98, 131-136, 124

[56] References Cited

U.S. PATENT DOCUMENTS

| 3,818,306 | 6/1974 | Marini | 363/124 X |
| 4,292,633 | 9/1981 | Goodwin, Jr. et al. | 363/124 X |
| 4,460,951 | 7/1984 | Fenter et al. | 363/21 X |

Primary Examiner—Peter S. Wong
Attorney, Agent, or Firm—Charles Hieken

[57] ABSTRACT

Power conversion system includes power amplifiers that receive D.C. potentials from rectifying and filtering circuitry that direct couple the power amplifiers to the conventional A.C. power lines. An output transformer couples the power amplified signal to an output terminal. A feedback network couples the output terminal to one input of a signal combiner that has a reference input terminal for receiving a reference signal. An isolation amplifier couples the output of the signal combiner to the input of the power amplifiers. The isolation amplifier has a combining network that receives on one input a signal from the input terminal coupled through a high pass filter cascaded with a transformer coupled amplifying stage and on the other input from the input terminal through an optocoupler amplifying stage cascaded with a low pass filter. The power amplifiers comprise like class B amplifiers having substantially the same gain driving the primary of the output transformer. An attenuator imparts an attenuation to the output of the first amplifier that is the reciprocal of the amplifier gain and delivers the attenuated signal to the input of the second amplifier. Current shunts in series with a lead from the rectifiers and filters provide a signal representative of the current drawn by each of the class B amplifiers. For D.C. output, there is a precision diode and 600 Hz signal inverter that couples the output of the signal combining network with the isolation amplifier and a 600 Hz output transformer cascaded with a rectifier and filter that couples the output of the power amplifiers to the output terminal.

6 Claims, 5 Drawing Figures

POWER CONVERTING

The present invention relates in general to power converting and more particularly concerns novel apparatus and techniques for providing a wide range of selectable voltages and currents especially useful in connection with testing power system protective apparatus in a relatively compact reliable relatively inexpensive system that operates with relatively high efficiency.

It is an important object of the invention to provide an improved power conversion system. According to the invention, there is power amplifying means for providing a controllable output signal that may assume a relatively high power level. There is rectifying and filtering means intercoupling said power amplifying means and an A.C. power input for converting A.C. power on said A.C. power input into D.C. power for energizing said power amplifying means. There is means including output transformer means for coupling the output of said power amplifying means to an output terminal. There is means for combining a feedback signal derived from said output terminal with a signal on a reference input representative of the output signal then desired to provide a combined signal, and isolation amplifying means for coupling the combined signal to said power amplifying means while providing isolation to control said power amplifying means to deliver the desired output signal on said output terminal.

In a specific form of the invention, the isolation amplifying means comprises transformer coupled amplifying means for intercoupling the input and output in parallel with optically coupled amplifying means intercoupling the input and output for signals below the predetermined cutoff frequency. Preferably there is high pass filtering means cascaded with said transformer coupled amplifying means and low pass filtering means cascaded with said optical coupled amplifying means.

Numerous other features, objects and advantages of the invention will become apparent from the following specification when read in connection with the accompanying drawing in which.

Figure 1:
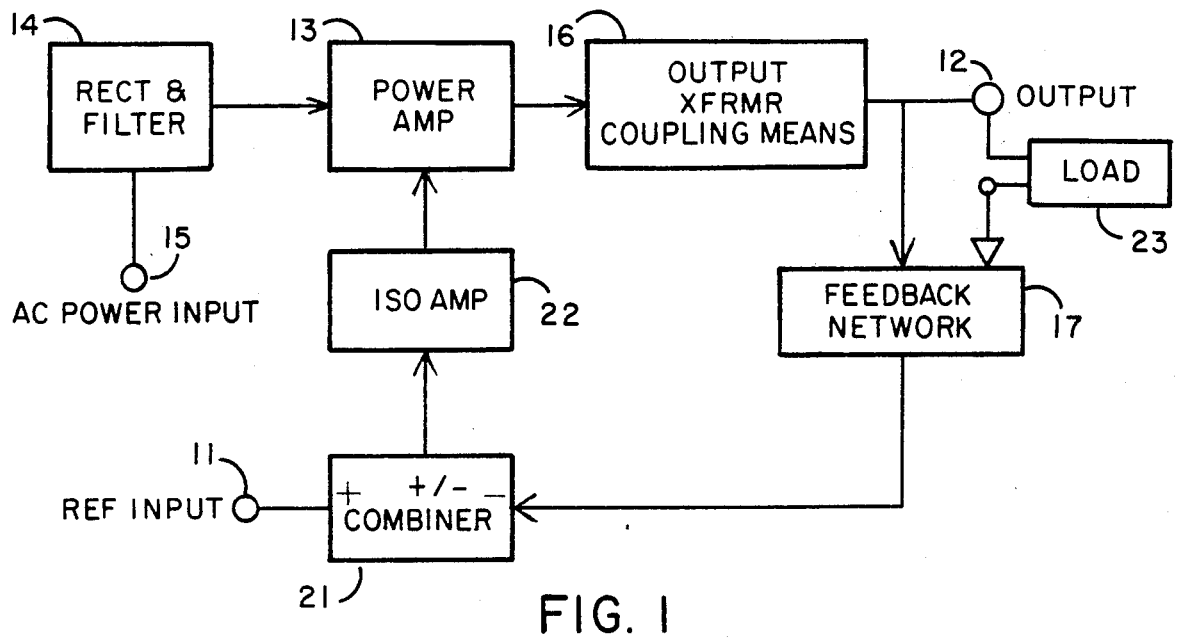
FIG. 1 is a block diagram illustrating the logical arrangement of a system according to the invention.

With reference now to the drawing and more particularly FIG. 1 thereof, there is shown a block diagram illustrating the logical arrangement of a power conversion system according to the invention. A reference signal on input terminal 11, which may be provided by a microprocessor controlled source is amplified and provided on output terminal 12. Power amplifier 13 receives D.C. operating potentials from rectifier and filter 14 that directly couples power amplifier 13 to A.C. power input terminal 15 that is typically connected to the 120 V.A.C. power line. The output of power amplifier 13 is coupled to output terminal 12 by output transformer coupling means 16. Feedback network 17 couples output terminal 12 to the −input of combiner 21. The +input of combiner 21 receives the reference signal on reference input terminal 12 to provide a combined signal that is coupled by isolation amplifier 22 to power amplifier 13 for amplification.

Having described the physical arrangement of the system of FIG. 1, its mode of operation and certain features will be described. Power amplifier 13 is preferably a known linear power amplifier, but receives D.C. potentials from rectifier and filter 14 that directly connects power amplifier 13 to A.C. power input 15. Output transformer coupling means 16 not only provides impedance matching between power amplifier 13 and ground references load 23, but also isolates load 23 from the A.C. power on terminal 15. Isolation amplifier 22 provides isolation on the input side of power amplifier 13 from the A.C. power on input 15. Thus, a ground referenced source may deliver the signal to reference input 11 that is combined with the ground-referenced feedback signal at the −input to provide a ground-referenced input signal to isolation amplifier 22 that provides both isolation and amplification.

The particular means for providing the reference input signal is not a part of this invention. This reference signal may be provided by a microprocessor controlled source or another signal source that may be reproduced on output terminal 12 at desired amplitude and phase for a desired test of load 23.

An important advantage of using this line-operated power supply approach over a conventional transformer coupled linear power supply approach are reduced size, weight and cost and increased efficiency. Since a large part of the total system weight in a conventional system is in the magnetics, eliminating a 50/60 Hz input power supply transformer, which totals approximately twice the weight of the output transformer effects substantial savings in weight, size and cost. By using a higher voltage and lower current supply with the direct connection to A.C. power input 15, the invention obtains a significant increase in the efficiency of rectifying and filtering.

The line-operated power supply approach according to the invention also has advantages over high-frequency switching-regulator power supplies in terms of cost, efficiency and development effort. A typical switching regulator must be designed to handle peak power requirements when the peaks are considerably longer than the switching period. The peak-to-average power ratio required by a 50/60 Hz linear amplifier providing a sinusoidal output waveform can be rather high. To meet these requirements with a switching-regulator requires a considerably over-rated commercially available unit or a specially designed custom unit, presenting a formidable task at the high power levels required.

Bridge rectifying and filtering in rectifier and filter 14 typically produced a 150 V.D.C. nominal voltage level to power amplifier 13. A bridge or halfbridge amplifier designed to dissipate the amount of power under "worst case" high input power line conditions performs satisfactorily.

When one side of the A.C. power line connected to terminal 15 is ground referenced, the 150 V.D.C. potential provided by rectifier and filter 14 has a large A.C. common mode component with respect to ground.

Isolation amplifier 22 is designed to withstand this A.C. common mode component.

Figure 2:
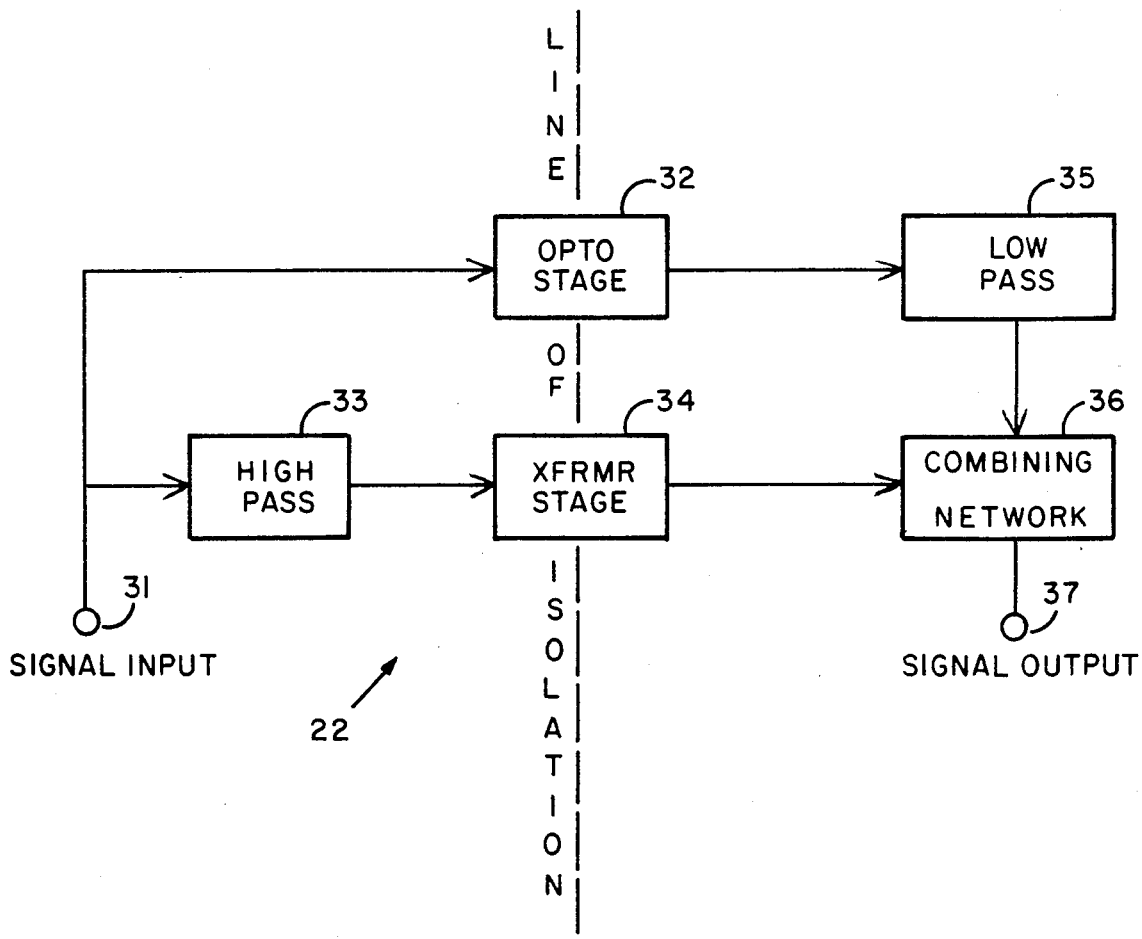
FIG. 2 is a block diagram illustrating the logical arrangement of a preferred form of isolation amplifier according to the invention.

Referring to FIG. 2, there is shown a block diagram illustrating the logical arrangement of isolation amplifier 22. A signal on input terminal 31 is coupled directly to optical coupler stage 32 and through high pass filter 33 to transformer coupled stage 34. The output of optical coupler stage 32 is coupled through low pass filter 35 to one input of combining network 36. The output of transformer coupled amplifying stage 34 is coupled to the other input of combining network 36 to provide the combined signal on output 37. High pass filter 33 and low pass filter 35 typically have a cutoff frequency of substantially 5 kHz so that the optocoupler stage 32 transmits spectral components from D.C. to 5 kHz while transformer coupled stage 34 transmits spectral components within the frequency range 5 kHz to 200 kHz, regions in which both amplification stages achieve good common mode rejection and linearity. The combined action typically provides unity gain from D.C. to 200 kHz at typical commercial op-amp signal levels. D.C. power is typically provided by a transformer-isolated 15 V.D.C. power supply (not shown). This broad bandwidth and good common mode rejection facilitate achieving good closedloop transient response, noise immunity and stability in the overall system of FIG. 1.

Figure 3:
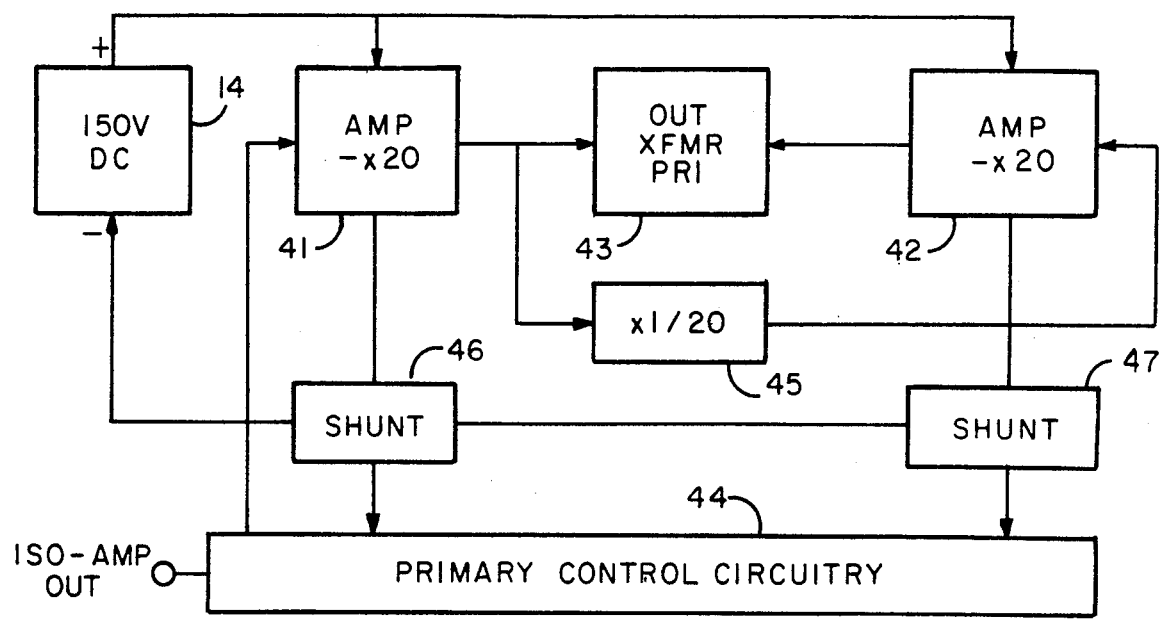
FIG. 3 is a block diagram illustrating the logical arrangement of a high voltage amplifying section.

Referring to FIG. 3, there is shown a suitable form of power amplifier 13 suitable for delivering regulated 50/60 Hz current at a minimum of 300 V.A. continuous/500 V.A. intermittent. The power amplifier comprises a pair of class B amplifiers 41 and 42 connected in full bridge to impedance matching output isolation transformer 43. Rectifier and filter 14 provide the nominal 150 V.D.C. operating potentials to amplifiers 41 and 42. Primary control circuitry 44 receives the signal from isolation amplifier 22 and provides it to input amplifier 41 having a gain of −20. The output of amplifier 41 is coupled by attenuator 45 to the input of amplifier 42. Shunts 46 and 47 provide signals representative of the current provided by amplifiers 41 and 42, respectively, to be compared with ISO-AMP output voltage signal at primary control circuitry 44 and form a feedback loop that achieves a transconductance transfer; that is, voltage in controls current out.

Transformer 43 typically has six output taps for delivering maximum currents of from 5 to 160 amperes on the respective taps. Transformer 43 preferably has a dual coil primary winding. These coils may be connected in series or parallel to alter the power dissipation in the amplifier and the compliance voltage available at the output taps of transformer 43 while allowing each tap to be used at its full secondary current rating regardless of coil configuration. The result is that each tap can be used to its full rating either continuously at the 300 V.A. rating, or intermittently at the 500 V.A. rating. Connecting the primary windings in parallel increases the V.A. rating for the higher intermittent rating while connecting them in series reduces the rating to the lower continuous V.A. rating. This change occurs because the compliance voltage available at the output taps changes depending upon the series or parallel connection of the primary coils. An advantage of this arrangement is that each secondary tap may be used at its full current rating, regardless of the primary winding coil configuration and may be used at its full resolution either continuously at the 300 V.A. rating, or intermittently at the 500 V.A. rating. This arrangement represents an improvement over prior art approaches which achieved continuous ratings by limiting use to a small percentage of a given output tap current rating, thereby forcing operation in the noisier and less precise low end of a range. In contrast, the invention may be operated in the quieter more precise high end of a range.

Amplifiers 41 and 42 connected in bridge may be essentially identical and have inverting voltage transfers of 20. Each preferably includes active current limiting in the output stages to protect against overdrive and transients.

An advantage of driving amplifier 42 with the output of amplifier 41 attenuated by a factor of 20 instead of driving each with an identically inverted input signal, avoids the problem of one amplifier limiting before the other during overload conditions (active output stage current limiting). This condition results in the overall control loop driving the nonlimiting amplifier on to correct for the limiting amplifier, which is turning off, and causes a severe power dissipation imbalance between the amplifiers at a time when overall power dissipation may be at a maximum; that is, a potential self-destruct mode. Driving amplifier 42 with the output of amplifier 41 assures that amplifier dissipation will remain balanced during current limiting conditions so long as driver amplifier 41 limits before driven amplifier 42.

Another feature of the system of FIG. 3 resides in deriving current feedback from resistive shunts 46 and 47 in the negative leg connected to rectifiers and filters 14. This feedback signal may be used to drive the entire bridge amplifier arrangement as a transconductance stage; that is, a current source. Driving the primary of output transformer 53 with an effective current source in this manner results in low D.C. offsets and cleaner saturating characteristics and transient performance.

Preferably a selector switch, not shown, coordinates the user selected output transformer tap on output transformer 16 with one of four loop compensation settings for feedback network 17. Switching between 500 V.A. and 300 V.A. (series or parallel coils for the primary winding of output transformer 16) preferably causes an additional change in loop compensation and feedback network 17, typically a change in loop gain with a controlled attenuator. The system also preferably includes low level analog and digital circuitry of known type for scaling the I-output/V-input ratio, such as analog dividers.

Preferably an integrated circuit two-terminal temperature transducer of known type monitors the output transistor case temperatures and delivers a temperature signal to protection circuitry along with other operating parameters to limit maximum output transistor junction typically to 130° C. If this temperature is exceeded, the protection circuitry preferably provides a signal to the microprocessor signal generator that typically delivers the signal to input terminal 11 to shut off and simultaneously reduces the active current limiting in the transistor output stages of amplifiers 41 and 42 to a reduced level.

The only electrical difference between output amplifiers 41 and 42 is the level at which output stage current limiting occurs. Each amplifier may comprise the known approach of a transistor differential front end, a common emitter gain stage and a complementary class B output stage. The output stage preferably uses a series rather than parallel transistor configuration of 10 semiconductor devices per amplifier. This arrangement allows the user of lower voltage bipolar semiconductor devices and virtually eliminates secondary breakdowns. A wide variety of output semiconductor devices in the TO-3 250-300 watt package may be used, including discrete or monolithic Darlingtons. A suitable package is the Motorola dual-chip MJ11032-33 monolithic Darlington device family. The output devices are preferably mounted on four mounting surfaces of an extruded aluminum tunnel-type forced air heat sink, such as made by Trantec. Each mounting surface preferably has its own circuit board. Thus, amplifiers 41 and 42 typically include four of these boards connected together with a fifth board that carries the input and drive stage amplifier circuitry.

Figure 4:
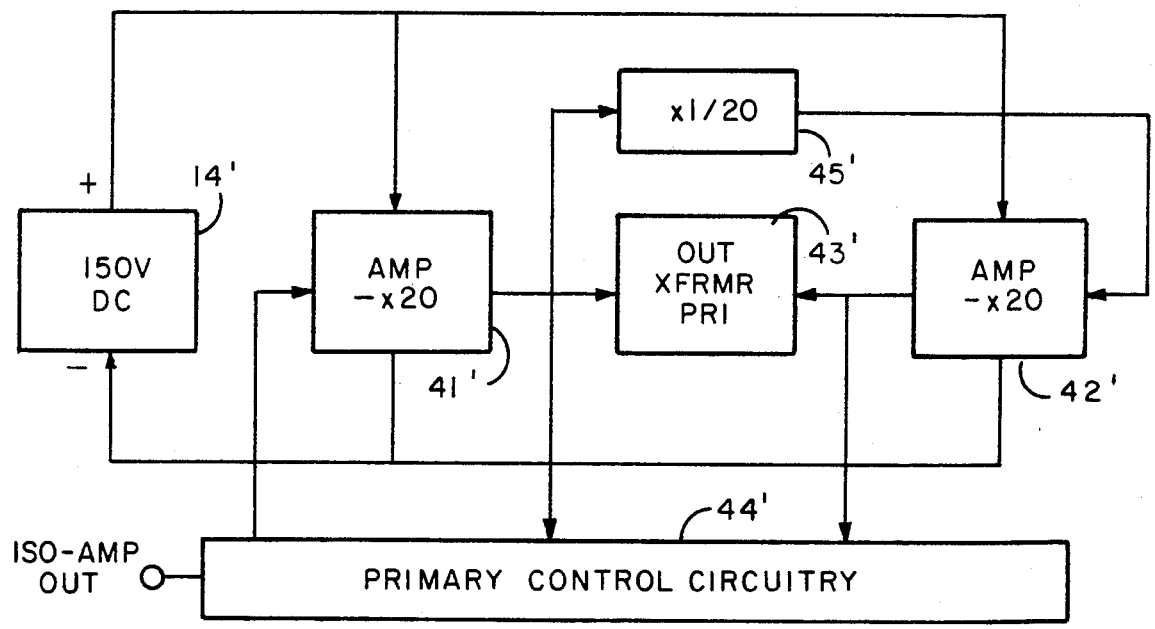
FIG. 4 is a block diagram illustrating the logical arrangement of a convertible source high voltage section.

Referring to FIG. 4, there is shown another form of power amplifier 13 that may function as a convertible source configured as an A.C. current source, and A.C. voltage source, D.C. voltage source, or D.C. current source. Regardless of which mode of operation is selected, the same basic linear power conversion stage is used and is similar to the power amplifier of FIG. 3 in that two nearly identical linear power amplifiers 41' and 42' are connected in a bridge configuration across the 150 V.D.C. power rails connected to rectifier and filter 14'. This source differs from that shown in FIG. 3 in that the bridge arrangement always operates as a voltage transfer stage and the power level is typically much lower. Instead of current shunts 46 and 47 providing current feedback to primary control circuitry 44, there is voltage feedback from each of amplifiers 41' and 42' to primary control circuitry 44'. When selected as an A.C. current source, the convertible source shown in FIG. 4 operates in essentially the same manner as the source shown in FIG. 3. In a representative system the output frequency may be selected as either 50, 60, 100, 120, 150 or 180 Hz, corresponding to the fundamental power line frequencies available in most countries, and second and third harmonics thereof. The particular frequencies are selected by the microprocessor controlled signal generator typically used to deliver the input signal to reference input terminal 11. In a typical embodiment output transformer 43' has three tap ranges for its secondary winding of 2, 10 and 20 amperes r.m.s. at a power level of 90 voltage amperes.

When selected as an A.C. voltage source, operation is similar to that just described as a current source with the exception that different output secondary transformer taps from output transformer 43' are used which typically provide ranges of 150, 300, 600 volts r.m.s. and voltage feedback is taken directly from the output across the load (not shown in FIG. 4). Preferably, different feedback compensation is used for feedback network 17 and power rating is preferably reduced to 60 V.A.

Figure 5:
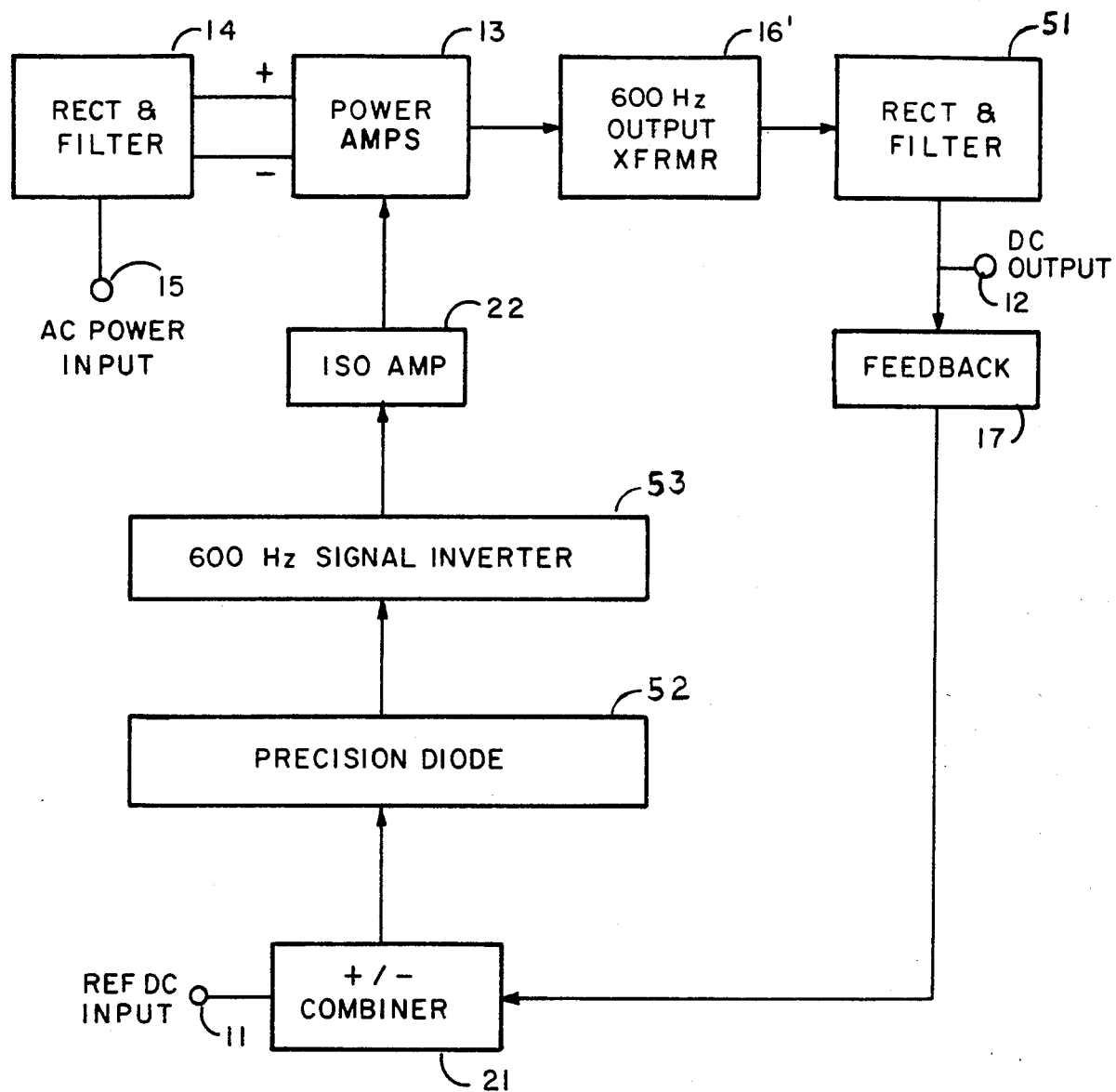
FIG. 5 is a block diagram illustrating the logical arrangement of a D.C. convertible source according to the invention.

Referring to FIG. 5, there is shown the configuration for use as a D.C. source. The system of FIG. 1 includes 600 Hz output transformer 16' as comprising the output transformer coupling means 16 and rectifier and filter 51. A precision diode 52 and 600 Hz signal inverter 53 couples the output of combiner 21 to isolation amplifier 22 so that the signal received by the latter is a 600 Hz signal of amplitude proportional to the D.C. signal at the output of combiner 21. Power amplifiers 13, substantially as shown in FIG. 4, amplify the 600 Hz signal that is coupled by output transformer 16' to rectifier and filter 51 to provide the D.C. output signal on output terminal 12. The 600 Hz inverting frequency is high enough to use relatively small transformer and filter components and low enough for the control loop to maintain good loop gain characteristics. Since the system operates in an essentially linear mode (except while polarity switching), reaction to load transients is quite good and much faster than normally might be expected with a 600 Hz inverting frequency. Furthermore, the active current limiting in the amplifiers 13 reduces the surge requirements of the rectifiers and filter capacitors in rectifier and filter 51. In this mode of operation current limiting becomes a normal mode of operation for a short period of time following each polarity transition.

The invention thus functions as a power conversion system for converting ordinary A.C. power into a wide variety of output signals capable of assuming relatively high power levels to facilitate testing a wide range of components. It is evident that those skilled in the art may now make numerous uses and modifications of and departures from the specific apparatus and techniques disclosed herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Power conversion apparatus comprising, an input terminal for receiving A.C. power from a conventional power line, power amplifying means for amplifying an input signal, rectifying and filtering means for direct coupling said power amplifying means to said A.C. power input terminal for providing D.C. energy to said power amplifying means, an output terminal, output transformer coupling means for coupling said power amplifying means to said output terminal while providing D.C. isolation from said A.C. power input terminal, a reference input terminal for receiving a signal for controlling the signal on said output terminal, feedback means for providing a feedback signal, combining means for combining a feedback signal from said feedback means with a signal on said reference input terminal to provide a combined signal, and isolation amplifying means for coupling said combined signal to said power amplifying means while providing D.C. isolation for both said output terminal and said reference input terminal from said A.C. power input terminal.

wherein said isolation amplifying means comprises, a signal input terminal, a signal output terminal, transformer coupled amplifying means, an optocoupler amplifying means for providing D.C. isolation, low pass filtering means for selectively transmitting spectral components below a predetermined cutoff frequency, high pass filtering means for selectively transmitting spectral components above said cutoff frequency, a combining network coupled to said output terminal having first and second inputs for providing an output signal representative of the combination of the signals on said first and second inputs, means including said high pass filtering means and said transformer coupled amplifying means for coupling said input terminal to said first input, and means including said optocoupler amplifying means and said low pass filtering means for coupling said signal input terminal to said second input, whereby said optocoupler amplifying means and said transformer coupled amplifying means coact to provide D.C. isolation between said signal input terminal and said signal output terminal.

2. Power conversion apparatus comprising, an input terminal for receiving A.C. power from a conventional power line, power amplifying means for amplifying an input signal, rectifying and filtering means for direct coupling said power amplifying means to said A.C. power input terminal for providing D.C. energy to said power amplfiying means, an output terminal, output transformer coupling means for coupling said power amplifying means to said output terminal while providing D.C. isolation from said A.C. power input terminal, a reference input terminal for receiving a signal for controlling the signal on said output terminal, feedback means for providing a feedback signal, combining means for combining a feedback signal from said feedback means with a signal on said reference input terminal to provide a combined signal, and isolation amplifying means for coupling said combined signal to said power amplifying means while providing D.C. isolation for both said output terminal and said reference input terminal from said A.C. power input terminal, wherein said power amplifying means comprises, first and second power amplifying means for providing an amplified signal connected in a bridge circuit, said output transformer coupling means comprising an output transformer having primary winding means for receiving amplified signals from said first and second amplifying means and coupled thereto, each of said first and second amplifying means having a power amplifier input and characterized by first and second gains, means for coupling said combined signal to the input of said first amplifying means, attenuating means characterized by a first attenuation coupling the output of said first amplifying means to the input of said second amplifying means, the product of said first gain and said first attenuation being substantially equal to said second gain.

3. Power conversion apparatus in accordance with claim 2 and further comprising, first and second shunt resistive means in series with the D.C. current path between said first and second amplifying means, respectively, for providing current feedback signals representative of the current drawn by said first and second amplifying means respectively.

4. Power conversion apparatus comprising, an input terminal for receiving A.C. power from a conventional power line, power amplifying means for amplifying an input signal, rectifying and filtering means for direct coupling said power amplifying means to said A.C. power input terminal for providing D.C. energy to said power amplifying means, an output terminal, output transformer coupling means for coupling said power amplifying means to said output terminal while providing D.C. isolation from said A.C. power input terminal, a reference input terminal for receiving a signal for controlling the signal on said output terminal, feedback means for providing a feedback signal, combining means for combining a feedback signal from said feedback means with a signal on said reference input terminal to provide a combined signal, isolation amplifying means for coupling said combined signal to said power amplifying means while providing D.C. isolation for both said output terminal and said reference input terminal from said A.C. power input terminal, inverting means for coupling said combined signal to said isolation amplifying means to provide a signal of a predetermined frequency having an amplitude representative of the D.C. component of said combined signal, and said transformer coupling means comprises, a transformer for transmitting the amplified signal of said power amplifying means at said predetermined frequency, and rectifying and filtering means coupled to the output of said transformer for delivering a D.C. signal to said output terminal representative of the amplitude of said signal of predetermined frequency.

5. Power amplifying means comprising, first and second power amplifying means for providing an amplified signal connected in a bridge circuit, means for combining amplified signals from said first and second amplifying means, each of said first and second amplifying means having a power amplifier input and characterized by first and second gains, means for coupling an input signal to the input of said first amplifying means, and attenuating means characterized by a first attenuation coupling the output of said first amplifying means to the input of said second amplifying means, the product of said first gain and said first attenuation being substantially equal to said second gain.

6. Power amplifying means in accordance with claim 5 wherein said means for combining comprises an output transformer having primary winding means for receiving amplified signals from said first and second amplifying means and coupled thereto.

* * * * *